March 5, 1957     W. D. BURTON     2,784,307
MARKER BEACON RECEIVER
Filed Aug. 25, 1952     6 Sheets-Sheet 1
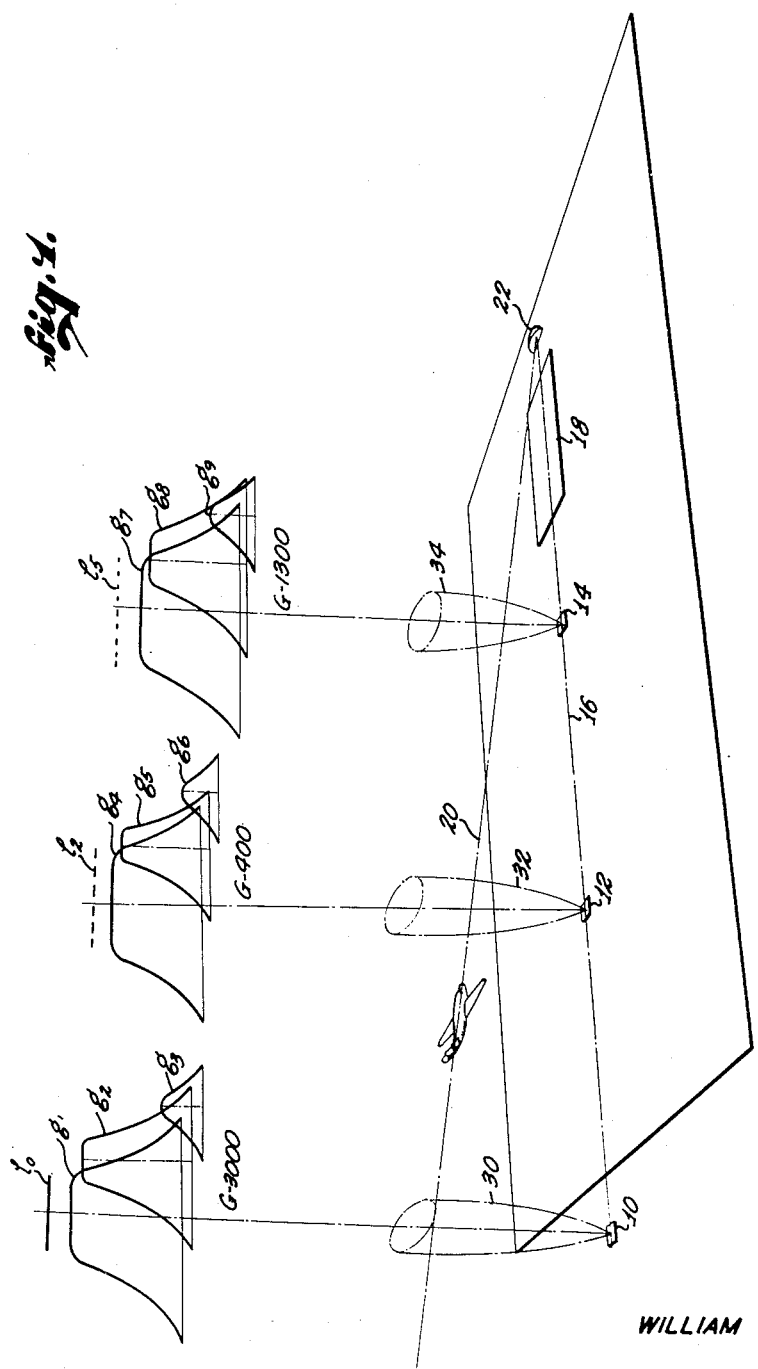
WILLIAM D. BURTON,
INVENTOR.
BY
Paul A. Weilein
ATTORNEY.

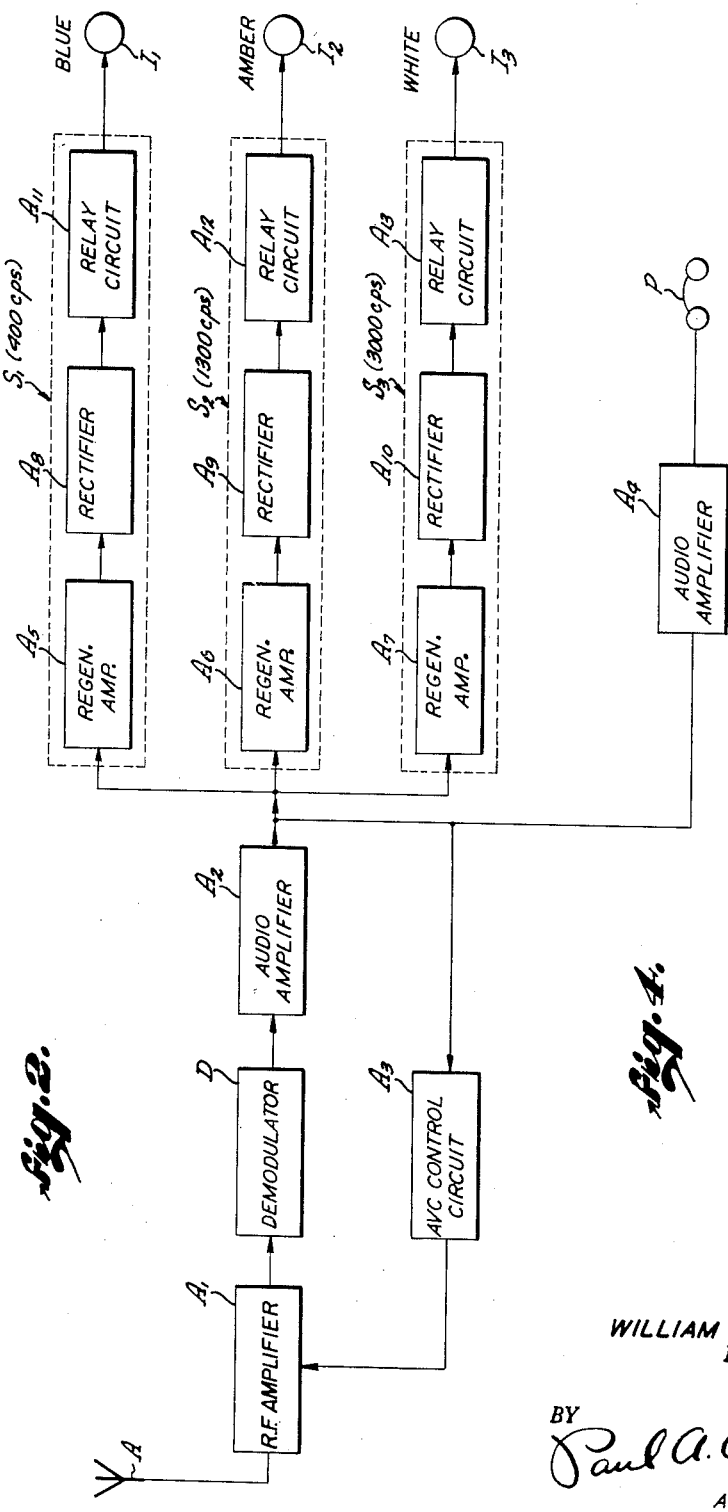

March 5, 1957

W. D. BURTON 2,784,307

MARKER BEACON RECEIVER

Filed Aug. 25, 1952

WILLIAM D. BURTON,
INVENTOR.

BY Paul A. Weilein

ATTORNEY.

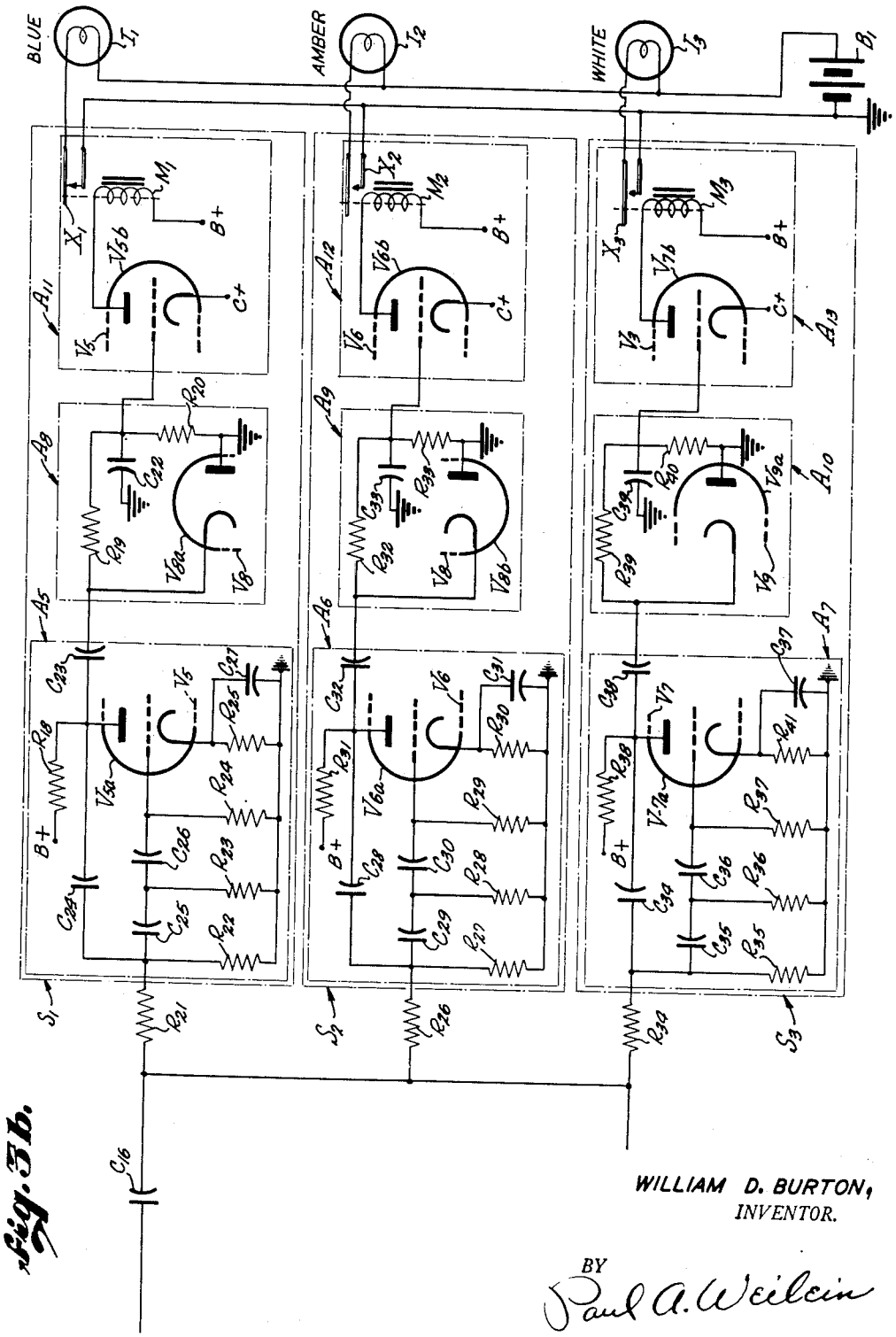

WILLIAM D. BURTON,
INVENTOR.

BY Paul A. Weilein
ATTORNEY.

WILLIAM D. BURTON,
INVENTOR.

BY
Paul A. Weilein
ATTORNEY.

United States Patent Office 2,784,307
Patented Mar. 5, 1957

2,784,307

MARKER BEACON RECEIVER

William D. Burton, LaCrescenta, Calif., assignor to Flite-Tronics, Inc., Burbank, Calif., a corporation of California Application August 25, 1952, Serial No. 306,133

5 Claims. (Cl. 250—20)

This invention relates to signal systems employing relays, and especially to improvements for selectively operating one or more relays by means of a modulated carrier wave without operating others. More particularly, my invention relates to improvements in radio receiver systems carried by aircraft to assist in navigation along a line of location markers and in landing by means of instruments that employ radio markers on the ground.

In radio navigation of aircraft, it is common to employ a series of airway-markers at designated locations along a line of flight. Such a marker comprises a radio frequency transmitter that directs a radio frequency beam vertically upward in a narrow cone. Such a marker customarily operates at a carrier frequency of 75 mc./s. (megacycles per second), and is modulated at an audio frequency.

Broadly speaking, markers are of three types, fan markers, Z-markers and instrument landing markers. A Z-marker emits a modulated carrier wave continuously, whereas fan markers and instrument landing markers generally emit a modulated carrier at frequent short intervals. A Z-marker is generally located at a radio beacon range station projecting an uninterrupted beam directly upwardly in the cone of silence that normally exists directly above such a range station.

An instrument landing system generally employs two instrument landing markers, namely, an outer marker and a middle marker that are aligned with a radio beam passing over a runway along an inclined glide path that is to be followed by the aircraft in landing. Each of these markers consists of a fan-shaped radio beam projecting vertically upward along an axis intercepting the radio beam that is to be followed in landing. Both the outer marker and the middle marker employ carrier waves of 75 mc./s. The outer marker is normally modulated by an audio-frequency wave of 400 C. P. S. and the carrier wave is keyed at a sub-audio frequency of approximately 2 C. P. S., the modulation generally being in the form of pulses at a repetition rate of 2 C. P. S. Similarly, the middle marker is modulated at an audio-frequency of 1300 C. P. S. and the modulation is keyed at a sub-audio frequency of approximately 5 C. P. S. In practice, the carrier wave itself is often keyed, being interrupted at regular intervals. However, the modulating audio-frequency wave could also be keyed. Various features of such systems commonly employed are described, for example, in two publications of the United States Government Printing Office identified as Airways Operations Training Series, Bulletin No. 1 "Instrument Landing Systems" and Airways Operations Training Series, Bulletin No. 2 "Location Markers and Homing Facilities."

Marker beacon receivers heretofore employed for detecting such markers, outer markers and middle markers have employed a radio frequency receiver tuned to 75 mc./s., a rectifier in the output thereof and a filter arrangement consisting of three band-pass filters connected to the rectifier, the pass bands of the band-pass filters being centered respectively at about 400 C. P. S., 1300 C. P. S., and 3000 C. P. S. The outputs of the three filters operate three corresponding signal lights respectively. The three signal lights are of different colors, such as white, amber and blue. The white light is operated while a 3000 C. P. S. signal is received, thus indicating passage of an airplane over a fan or a Z-marker; the blue light is illuminated when a 400 C. P. S. signal is received, thus indicating when the airplane is flying over the outer marker; and an amber light is illuminated when a 1300 C. P. S. signal is received, thus indicating passage of the aircraft over the middle marker. In practice, blue and amber lights, which flash on and off at approximately 2 and 5 C. P. S. respectively, are employed to indicate whether or not an airplane is flying over the center of the outer and middle markers and also to indicate the departure of the flight path from the center of the markers.

In addition, airphones are connected to the output of the detector to permit the pilot to listen to the marker signals. The use of such an earphone is particularly advantageous when the strength of the signals is insufficient to illuminate any of the signal lights but is still great enough to indicate that the airplane is flying in the neighborhood of a marker. Earphones are also employed where a marker is voice-modulated with the name or other identification of the beacon station.

This invention relates particularly to a radio receiver to be carried by an aircraft for use in navigating and landing an aircraft, and the invention is described hereinbelow with particular reference thereto, even though various features of the invention have many other uses.

One feature of this invention resides in the employment of a plurality of tuned trigger circuits connected to the output of the detector of the marker receiver. Each of the trigger circuits is tuned to a different frequency, namely, 400 C. P. S., 1300 C. P. S. and 3000 C. P. S. Each of the trigger circuits operates when an audio-frequency wave of corresponding frequency is impressed thereon, provided the amplitude of that audio-frequency wave exceeds a predetermined relatively low value, but also tends to operate when the amplitude of a different audio-frequency wave exceeds a predetermined relatively high value. According to this invention, operation of more than one of the trigger circuits by an audio-frequency wave impressed on all three of them is prevented in part by the resonant characteristics of the circuits and in part by varying the gain of the carrier wave amplifier as an inverse function of the strength of audio-frequency wave above said predetermined low value to maintain the amplitude of the audio-frequency wave below any such predetermined high value. Specifically, this result is achieved by connecting an automatic volume control circuit between the output of the detector and a point within the carrier wave amplifier that is connected to the input of the detector. The use of such an automatic volume control circuit also prevents the level of the audio-frequency signal supplied to the earphones from becoming excessive while the aircraft is flying over one of the markers and also compensates for differences in modulation levels of the markers.

Another feature of this invention consists in the employment of circuits having suitable time constants to permit the trigger circuits to operate when flying over a marker but to prevent short transients such as those produced by ignition noise, television signals, and the like from operating the trigger circuits.

Another feature of this invention resides in the employment of light-weight phase-shift regenerative amplifiers employing only resistances and condensers as trigger circuits to achieve regeneration at the respective frequencies to which the amplifiers are tuned. This results in a considerable reduction in weight of the system compared with prior systems employing iron-core inductances as filter elements. According to this invention the use of such a regenerative amplifier as a trigger circuit has the advantage that there is no danger of the signal lights operating when the audio-frequency signal impressed on that amplifier is low, but since the amplifier is caused to oscillate when the audio-frequency signal impressed thereon exceeds some predetermined value, the amplifier produces a large output which positively insures operation of the corresponding signal light at the proper time. Such a regenerative amplifier also renders the operation of the trigger circuits relatively independent of wave-forming distortion of the signal.

By virtue of the foregoing and other features of this invention that are described in detail hereinbelow, a marker receiver is provided which is of reduced weight, lower manufacturing cost, and increased reliability compared to those heretofore employed. These advantages and other advantages achieved with this invention will become apparent from the following detailed description taken in connection with the accompanying drawings wherein:

Figure 1 is a schematic diagram showing markers distributed along a flight course near a landing strip;

Fig. 2 is a block diagram of an improved marker receiver according to this invention;

Figs. 3a and 3b are detailed wiring diagrams of the improved marker receiver of Fig. 2;

Fig. 4 is a diagram showing how Figs. 3a and 3b are assembled to form the complete circuit illustrated in Fig. 2;

Figure 3A:
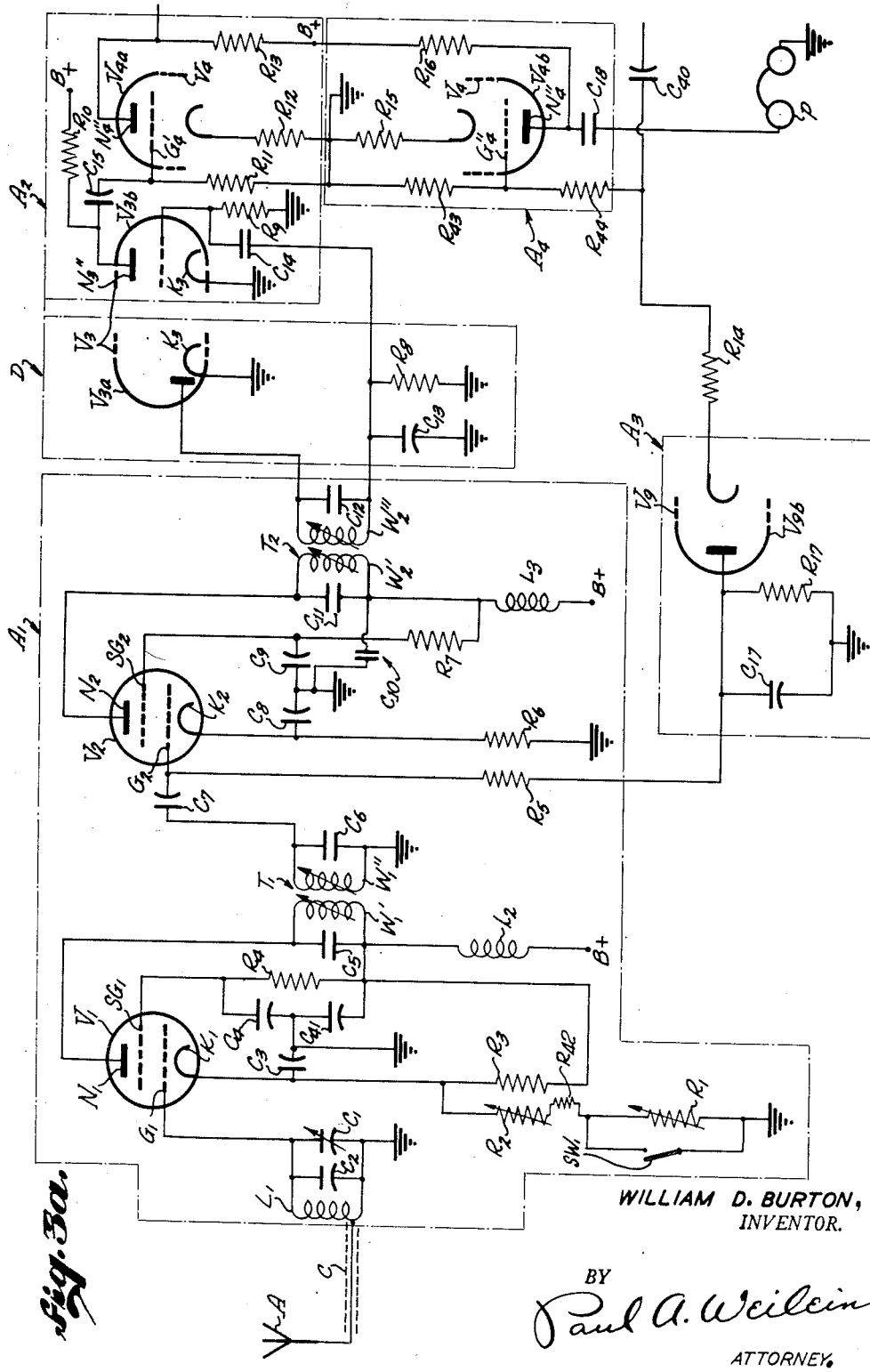

Referring to the drawings, and more specifically to Figure 1, there is illustrated, by way of example only, a fan-marker 10, an outer marker 12, and a middle marker 14, all aligned with the field axis 16 of a landing strip 18. A narrow glide beam 20 produced by a glide path transmitter 22 extends along a narrow inclined zone directly above the field axis 16. The fan-marker 10, the outer marker 12, and the middle marker 14 produce fan-shaped beams 30, 32 and 34 respectively, which extend vertically with their long horizontal axes transverse to the field axis 16 and their narrow horizontal axes parallel thereto. Directly above the illustration of the fan-marker 10, the outer marker 12, and the middle marker 14, there are shown isometric graphs G-3000, G-400, and G-1300 respectively employed to explain phenomena observed while flying the marker receiver over the markers along the flight and landing course.

In practice, an aircraft flying along a predetermined course may encounter a number of such fan markers as well as Z-markers, and when approaching a landing field the aircraft encounters an outer marker 12 and middle marker 14 while letting down along the glide beam 20. Apparatus incorporating the features of the present invention that are employed to detect and indicate the location of the aircraft relative to various markers is illustrated in Fig. 2.

The marker receiver of Fig. 2 comprises a radio-frequency amplifier $A_1$ having an antenna A connected to its input and mounted externally of the aircraft. The radio-frequency amplifier $A_1$ is tuned to 75 mc./s., the carrier wave frequency of the fan marker 10, the outer marker 12, and the middle marker 14, and thus serves to selectively amplify any radio wave received from these markers. The amplified carrier wave appearing at the output of the radio-frequency amplifier $A_1$ is passed through a detector, or demodulator, D, thus producing a rectified wave representing the modulation of the received carrier wave.

The graphs of Fig. 1 indicate the amplitudes of the rectified waves obtained as the aircraft flies over or near the markers. The graph G-3000 represents the amplitude of the 3000 cycle rectified wave that appears at the output of the demodulator D when the aircraft flies along a course directly above a Z-marker. In this case the output is continuous, as indicated by the line $1_0$. The graph G-400 represents pulses of 400 cycles that appear at the output of the demodulator when the aircraft is directly above the outer marker 12. In this case, the pulses occur at a sub-audio flashing frequency of about 2 C. P. S., as indicated by the line $1_2$. And graph G-1300 represents the rectified wave appearing at the output of the demodulator when the airplane is flying over the middle marker 14. In this case, the wave consists of a series of pulses of 1300 C. P. S., these pulses occurring at a sub-audio flashing frequency of about 5 C. P. S., as indicated by the line $1_5$. It will be noted that the pulses appear at a sub-audio frequency, that is, below about 10 C. P. S., but that each of the individual pulses consists of an audible-frequency wave.

The output of the demodulator D is amplified by an audio-frequency amplifier $A_2$ which is adapted to amplify all of the audio-frequency signals substantially uniformly. The output of the main audio amplifier $A_2$ is fed back through an automatic volume control circuit $A_3$ to an intermediate point in the radio-frequency amplifier $A_1$. For reasons which will become apparent hereinafter, the circuit constants of various elements of the receiver are so selected that the automatic volume control circuit is ineffective below a predetermined level but serves to compress the output of the radio-frequency pre-amplifier $A_1$, and hence also the output of the audio-frequency amplifier $A_2$, greatly at levels above that predetermined level.

The output of the main audio-frequency amplifier $A_2$ is applied to an auxiliary audio-frequency amplifier $A_4$ which has a set of earphones P at its output. These earphones are employed by the pilot to observe the strength of the audio-frequency signal that appears at the output of the main audio-frequency amplifier $A_2$.

Three signal detectors $S_1$, $S_2$ and $S_3$ in the form of trigger circuits are also connected in parallel at the output of the main audio-frequency amplifier $A_2$. Three corresponding indicator lamps $I_1$, $I_2$ and $I_3$ connected respectively in the output of the signal detectors $S_1$, $S_2$ and $S_3$ are employed to indicate the presence of one of the audio-frequency signals at the output of the audio-frequency amplifier. The three indicators $I_1$, $I_2$ and $I_3$ are in the form of blue, amber and white incandescent lights respectively.

According to the present invention, the three signal detectors $S_1$, $S_2$ and $S_3$ include corresponding regenerative amplifiers $A_5$, $A_6$ and $A_7$, each of which is adapted to oscillate at a different audio-frequency 400 C. P. S., 1300 C. P. S. and 3000 C. P. S. respectively when an audio-frequency signal of that frequency is impressed upon its input, provided that the level of the audio-frequency signal exceeds a predetermined amount. The level of the audio-frequency signal required to cause one of the regenerative amplifiers to oscillate is referred to hereinafter at times as the light-operating level, for the reason that when one of the regenerative amplifiers oscillates, the corresponding indicator light becomes energized, indicating the condition of oscillation by illumination. Corresponding rectifiers $A_8$, $A_9$ and $A_{10}$ are connected respectively to the output of the three regenerative amplifiers $A_5$, $A_6$ and $A_7$, and three corresponding relay circuits $A_{11}$, $A_{12}$ and $A_{13}$ are connected between the respective amplifiers and the corresponding signal indicators $I_1$, $I_2$ and $I_3$.

Each of the three rectifiers $A_8$, $A_9$ and $A_{10}$ is characterized by a rise time constant and a decay time constant that are lower than the reciprocal of the pulse frequencies of the signals being detected by the rectifiers. For reasons which will be apparent hereinafter, the rise time constant and the decay time constant of the rectifiers are about the same, namely, about 0.025 sec. The use of such a time constant prevents any of the relay circuits $A_{11}$, $A_{12}$ and $A_{13}$ from being operated if short period transients cause any of the regenerative amplifiers to oscillate momentarily, but nevertheless permits the relay circuits $A_{11}$, $A_{12}$ and $A_{13}$ to operate when any of the desired signals are being received.

Figure 5:
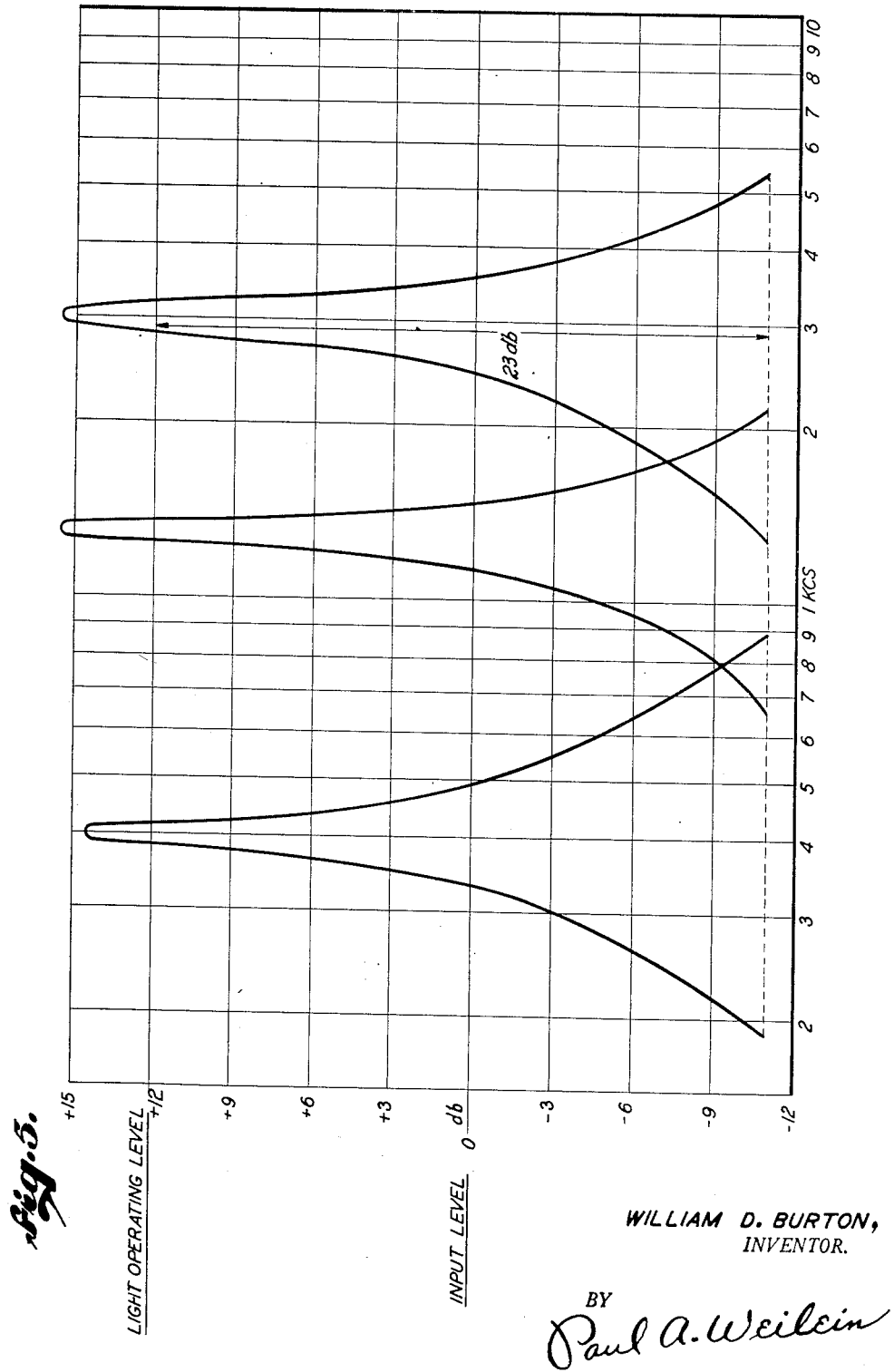
Fig. 5 is a graph showing the frequency characteristic of the three tuned trigger circuits.

As indicated above, each of the regenerative amplifiers $A_5$, $A_6$ and $A_7$ is in the form of a tuned circuit, the three amplifiers being tuned respectively to 400 C. P. S., 1300 C. P. S., and 3000 C. P. S. In practice, it is found that the audio-frequency signals with which the various carrier waves are modulated at the markers 10, 12 and 14 may vary somewhat from the nominal figures of 400 C. P. S., 1300 C. P. S. and 3000 C. P. S. For this reason, the regenerative amplifiers $A_5$, $A_6$ and $A_7$ are designed to respond to other frequencies in the neighborhood of the frequencies to which they are tuned. In other words, the regenerative amplifiers have medium Q's or broad frequency-response characteristics rather than high-Q or narrow frequency-response characteristics. Typical characteristics that have been employed in practice and found to be satisfactory are indicated in Fig. 5. Here it will be noted that when the amplification of any of the regenerative amplifiers exceeds 12 db (decibels) above the input level, the light-operating level is reached. In other words, when the frequency lies in a range of the characteristic where the amplification exceeds 12 db for any of the circuits, the corresponding regenerative amplifier $A_5$, $A_6$ or $A_7$ oscillates, causing the corresponding indicator light $I_1$, $I_2$ or $I_3$ to illuminate if the oscillation is sustained for a time long compared with the time constant of the corresponding rectifier $A_8$, $A_9$ or $A_{10}$. It will be noted that other signal frequencies may operate any of the signal channels if the signal applied is sufficiently strong, thus, for example, if a 12 db audio-frequency signal of 3000 C. P. S. operates the third detector channel $S_3$, causing corresponding indicator light $I_3$ to illuminate, then because of the nature of the circuit a 1500 C. P. S. signal having an intensity of about 23 db higher will also operate this detector channel.

In order to eliminate the possibility that any detector channel $S_1$, $S_2$ and $S_3$ shall be operated by an audio-frequency signal of an undesired frequency, the automatic volume control circuit $A_3$ is designed to compress the output of the audio-frequency amplifier $A_2$ strongly, when the signal appearing at the output of the main audio-frequency amplifier $A_2$ exceeds the light-operating level. At the same time, the automatic volume control circuit $A_3$ is designed to provide uniform amplification at low signal levels, so that no substantial compression occurs when none of the signal lights $I_1$, $I_2$ or $I_3$ is operating.

Figure 6:
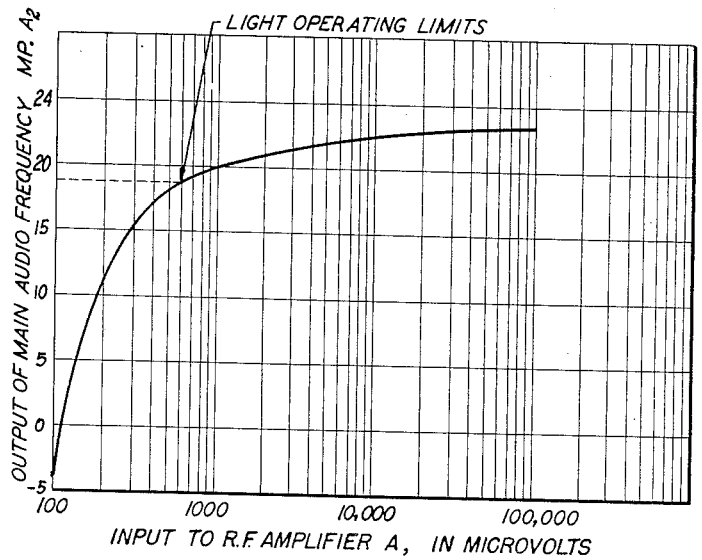
Fig. 6 is a graph illustrating the relationship between the automatic volume control circuit and the operation of the trigger circuits.

A characteristic curve showing the relationship between the input level to the radio-frequency amplifier $A_1$ and the output level of the audio-frequency amplifier is illustrated in Fig. 6. Here it will be noted that the amplification of the amplifier $A_2$ is substantially uniform, while the input to the radio-frequency amplifier $A_1$ is low, but that when the audio-frequency output reaches the light-operating level, further increase of the input to the radio-frequency amplifier $A_1$ does not cause any large increase in the output of the audio-frequency amplifier $A_2$. In fact it will be noted that once the light-operating level is reached, the audio-frequency output can increase by only about 4 db, regardless of how much the radio-frequency input is increased. Thus, no signal can be amplified enough to operate a non-corresponding signal channel. The particular curve of Fig. 6 represents the output of a particular radio-frequency amplifier $A_1$, demodulator D and audio-frequency amplifier $A_2$ for a 75 mc./s. radio-frequency signal modulated 30% by a continuous 3000 C. P. S. audio-frequency signal.

It will be noted that the light-operating level occurs at about the knee of the AVC characteristic illustrated in Fig. 6. The automatic volume control circuit $A_3$ maintains the signal impressed upon the detector circuits $S_1$, $S_2$ and $S_3$ below a predetermined relatively high level above which any of the signals could operate the wrong indicator $I_1$, $I_2$ or $I_3$, without however substantially interfering with the operation of any of the signal detector channels $S_1$, $S_2$ or $S_3$ by a signal of the corresponding frequency above the relatively low light-operating level. Thus, the automatic volume control circuit varies the gain of the radio-frequency amplifier inversely as a function of the output of the audio-frequency amplifier $A_2$ when this output is above the relatively low light-operating level, thereby maintaining the output below the relatively high level that would be required for any of the signal detector channels to be operated by a non-corresponding audio-frequency signal.

In order to assist the listener to identify the marker, it is desirable to modulate the carrier wave frequency with a voice signal representing the name, number or other identification of the marker. Usually such voice signals are impressed rather infrequently, say once every three or four seconds, and they are delivered in a monotone.

Figure 7:
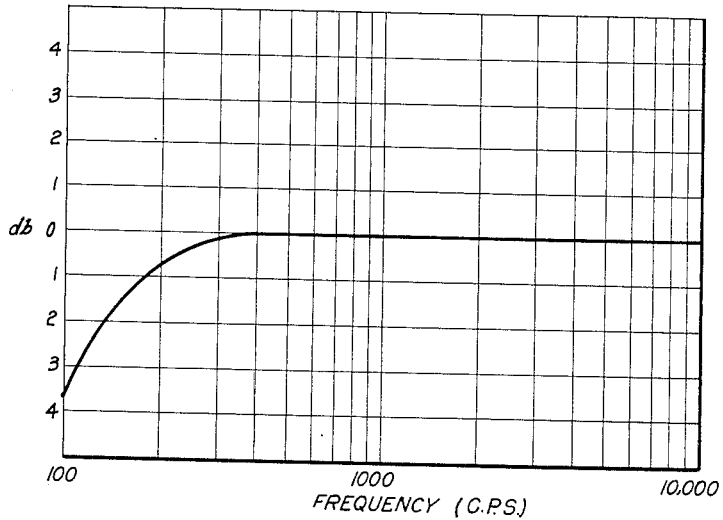
Fig. 7 is a graph showing the frequency response of the sound channel.

The auxiliary audio-frequency amplifier $A_4$ may be of a type which has a substantially uniform frequency characteristic, in the audio-frequency range, such as that illustrated in Fig. 7. Here, as indicated, the gain of the amplifier is substantially uniform above about 200 C. P. S. but falls off somewhat below that frequency.

In accordance with this invention, the rise time constant of the automatic volume control circuit is less than either the "on" or "off" flashing period. This time constant is also short compared with the period of any of the audio-frequency signals with which the markers are pulsed. This time constant is long compared with the period of any of the audio-frequency waves of voice signals that are necessary to identify any of the markers and is also the reciprocal of a low audio-frequency, thus being shorter than the time constant of any of the rectifier circuits $A_8$, $A_9$ and $A_{10}$. A rise time constant of about 0.01 sec. is satisfactory in the particular circuit herein described. However, the decay time constant is much longer, being of the order of the reciprocal of the lowest pulse frequency of the signals being fed to the rectifiers $A_8$, $A_9$ and $A_{10}$. A decay time constant of 0.10 sec. has been found to be satisfactory.

Such a rise time constant is unusual in an AVC system in that it is less than the reciprocal of normal syllabic frequencies, but is satisfactory in this system, because the listener is not interested in any expression in voice signals that identify fan markers but only in understanding their meaning.

The operation and use of a fan-marker receiver constructed in accordance with the present invention may be understood by reference to Fig. 1. While flying directly over the center of a Z-marker at a specific elevation, the intensity of the sound in the earphones P will gradually rise, reaching a constant level for a substantial period, and then fall off, as indicated in the curve $g_1$ of graph G–3000. Simultaneously the 3000 C. P. S. audio-frequency signal is impressed upon the input of the signal detector channels $S_1$, $S_2$ and $S_3$, and if the level of this audio-frequency signal is above the light-operating level, the 3000 C. P. S. regenerative amplifier $A_7$ oscillates, causing the white indicator light $I_3$ to illuminate. The white light $I_3$ remains illuminated for a predetermined substantial period, epending upon the altitude at which the airplane is flying and the flight speed. If the airplane passes over the Z-marker slightly to one side of the center thereof, the intensity of the sound will again rise to the same level and fall off, remaining at this level for a somewhat shorter period, as indicated by the graph curve $g_2$ of graph G–3000. In this case, since the level of the audio-frequency signal is above the light-operating level for a shorter period, the white indicator light $I_1$ remains illuminated for a shorter time. If the airplane passes still more to the side of the Z-marker, the level of the sound will gradually rise and will then gradually fall, but reach a relatively low maximum value below the above-mentioned level, as indicated by the curve $g_3$. In such a case, the white indicator light $I_3$ will not be operated at all. Thus, the variations in level of sound heard in the earphone, the presence or absence of illumination of the white indicator light $I_3$, and the duration of illumination of the white indicator light, indicate to the pilot or navigator how accurate his flight is in the neighborhood of the Z-marker.

During an instrument landing operation, the pilot or navigator flies downwardly along the glide beam 20, passing over the outer marker 12 and the middle marker 14. If he passes over the center of the outer marker, as he should, a 400 C. P. S. audio-frequency signal is heard in the earphones. The level of this sound gradually increases, reaching a maximum level, remains there for a short while and then gradually decreases, as indicated by the curve $g_4$ of graph G–400. During this portion of the operation, the audio-frequency signal occurs repeatedly in pulses of about 2 C. P. S. Simultaneously the pulses of 400 C. P. S. audio-frequency signal are impressed upon the input of the signal detector channels $S_1$, $S_2$ and $S_3$, and if the level of this audio-frequency signal is above the light-operating level, the 400 C. P. S. regenerative amplifier oscillates, causing the blue indicator light $I_1$ to illuminate. As a result of the pulsing of the 400 C. P. S. audio-frequency signal, the blue light flashes on and off at the sub-audio frequency of 2 C. P. S. The number of flashes observed depends partly upon the speed of the aircraft, the altitude at which it is flying and the horizontal displacement of the line of flight from the field axis 16. At one speed and elevation a certain number of flashes, say five, is noted if the plane is following the desired course as indicated by curve $g_4$ but a lesser number, say two, is noted if the plane is slightly off-course and none at all if it is still further off-course.

Likewise, if the pilot passes over the center of the middle marker, as he should, a 1300 C. P. S. audio-frequency signal is heard in the earphones. The level of this sound also gradually increases, reaching a maximum level, and remains there for a short while and then gradually decreases, as indicated by the curve $g_7$ of graph G–1300. During this portion of the operation, the audio-frequency signal occurs repeatedly in pulses of about 5 C. P. S. Simultaneously the pulses of 1300 C. P. S. audio-frequency signal are impressed upon the input of the signal detector channels $S_1$, $S_2$ and $S_3$, and if the level of this audio-frequency signal is above the light-operating level, the 1300 C. P. S. regenerative amplifier oscillates, causing the amber indicator light $I_2$ to illuminate. As a result of the pulsing of the 1300 C. P. S. audio-frequency signal, the amber light flashes on and off at the sub-audio frequency of approximately 5 C. P. S. Again the number of flashes observed depends partly upon the speed of the aircraft, the altitude at which it is flying and the horizontal displacement of the line of flight from the field axis 16. At one speed and elevation a certain number, say twelve, flashes are noted if the plane is following the desired course as indicated by curve $g_7$, but a lesser number, say six, may be noted if the plane is slightly off-course and none at all if it is still further off-course.

In practice, information obtained from the rise and fall of the level of the audio-frequency heard in the earphones P when passing over any of the markers 10, 12 and 14 is also employed to indicate to the pilot how accurately he is following a particular desired course, either along his general route or in his approach to a runway 18. In fact, the listener employing the earphones P is able to determine when he is in the neighborhood of one of the markers 10, 12 and 14, even though he is not passing over it closely enough to the center to cause one of the indicator lights $I_1$, $I_2$ or $I_3$ to operate. However, it will be noted that when close to a marker, the pilot is not required to rely upon recognition of the audio-frequency signal to determine which marker he is passing, as the marker is identified by the color of the indicator light $I_1$, $I_2$ or $I_3$ that is operated. Furthermore, because of the action of the automatic volume control circuit $A_3$ only one of the indicator lights $I_1$, $I_2$ or $I_3$ operates at a time, thus removing any ambiguity that might otherwise occur.

It will also be noted that because of the short rise time constant of the automatic volume control circuit $A_3$, the gain of the radio-frequency amplifier $A_1$ rises and falls as an indicator light flashes on and off. This does not disturb the listener to any great extent since the pulsing audio-frequency signal also disappears while the indicator light is off. However, it will be noted that if a voice signal is also modulating the carrier wave transmitted by the marker, the voice signal tends to hold the gain of the receiver steady because of the relatively long decay time constant of the AVC control circuit $A_3$. Such control of the gain of the receiver is affected only when the audio-frequency level appearing at the output of the audio-frequency amplifier $A_2$ exceeds a predetermined level indicating that the airplane is in the neighborhood of a marker. In practice, the "on" and "off" periods of the 400 C. P. S. and the 1300 C. P. S. signals are usually about equal or of the same order.

In Figs. 3a and 3b there is illustrated a specific practical embodiment of the invention. Signals received by the antenna A are fed through a coaxial cable C to the radio-frequency amplifier $A_1$ which comprises two stages including radio-frequency amplifier tubes $V_1$ and $V_2$ respectively. The coaxial cable C is connected directly to a radio frequency auto-transformer $L_1$, more specifically being connected to a portion of the inductance $L_1$ which matches the impedance of the cable. A fixed condenser $C_2$ and an adjustable condenser $C_1$ connected in parallel with the inductance $L_1$ are employed to tune the resonant circuit formed thereby to 75 mc./s. The signal appearing across the inductance $L_1$ is applied between ground and the signal grid $G_1$ of the radio-frequency amplifier tube $V_1$.

The amplified wave appearing between the anode $N_1$ and the cathode $K_1$ of the tube $V_1$ is transferred through a shielded radio-frequency transformer $T_1$ to the second stage. The primary and secondary windings of the $W_1'$ and $W_1''$ of the transformer $T_1$ are tuned to 75 mc./s. by fixed condensers $C_5$ and $C_6$ respectively. Specifically, the output of the transformer $T_1$ appearing across the secondary winding $W_1''$ is impressed through a coupling condenser $C_7$ upon the control grid $G_2$ of the tube $V_2$.

The amplified voltage appearing between the cathode $K_2$ and the anode $N_2$ of the amplifier tube $V_2$ is transferred through a second radio-frequency transformer $T_2$ to the demodulator D. The primary and secondary windings $W_2'$ and $W_2''$ are tuned to 75 mc./s. by the fixed condensers $C_{11}$ and $C_{12}$.

Various resistors $R_3$ and $R_4$ and condensers $C_3$, $C_4$ and $C_{41}$ are connected between the cathode $K_1$ and the screen grid $SG_1$ of amplifier tube $V_1$ in a conventional manner. Likewise various resistors $R_6$ and $R_7$ and condensers $C_8$ and $C_9$ and $C_{10}$ are connected in conventional manner, as indicated, to the cathode $K_2$ and screen grid $SG_2$ and the anode $N_2$ of tube $V_2$. Anode voltage is applied to the first amplifier tube $V_1$ through a choke $L_2$ and the primary winding of a transformer T, and to the anode of $N_2$ the second amplifier tube $V_2$ through the primary winding $W_2'$ of the second radio-frequency transformer $T_2$.

The first stage of the radio-frequency amplifier $A_1$ comprises a cathode circuit including a pair of rheostats or variable resistors $R_1$ and $R_2$ connected in series. A switch $SW_1$ is arranged across the resistor $R_1$. When the switch $SW_1$ is open, both resistors $R_1$ and $R_2$ are in the cathode circuit and the gain of the amplifier tube $V_1$ is at a minimum, but when the switch $SW_1$ is closed shorting out rheostat $R_1$, the gain of the amplifier tube $V_1$ is at a maximum. Thus the maximum value of amplification is determined by the setting of the rheostat $R_2$ and the minimum value is established by the setting of both rheostats $R_1$ and $R_2$. In practice, the switch $SW_1$ is closed when flying at relatively high altitudes, and is open when flying at relatively low altitudes, to compensate roughly for variation of intensity of a marker beam with altitude.

The demodulator D comprises an anode $N_3'$ cooperating with a cathode $K_3$ of rectifier section $V_{3a}$ of a multipurpose tube $V_3$, and the output of the demodulator appears across a resistor $R_8$ connected in parallel with a radio frequency bypass condenser $C_{13}$. The decay time constant of the resistor $R_8$ and condenser $C_{13}$ in the demodulator D is small compared to the period of any audio-frequency waves to be observed but long compared to the period of the radio waves being received, being in the present instance about 0.0002 sec. The rise time constant of this circuit is even shorter.

The audio-frequency output appearing across the resistor $R_8$ is impressed by means of a coupling condenser $C_{14}$ and a grid resistor $R_9$ upon the control grid $G_3$ of the triode section $V_{3b}$ of the tube $V_3$. The amplified audio-frequency signal appearing at the anode $N_3''$ of the triode section $V_{3b}$ of the tube $V_3$ appears across the output resistor $R_{10}$ and is applied through the coupling condenser $C_{15}$ and grid resistor $R_{11}$ to a control grid $G_4'$ of one section $V_{4a}$ of the duotriode $V_4$. The amplified output appearing at the anode $N_4'$ of this triode section appears across the load resistor $R_{13}$ and is available for utilization by the signal detector circuits $S_1$, $S_2$ and $S_3$, the auxiliary audio-frequency amplifier $A_4$ and the automatic volume control circuit $A_3$.

Anode voltage is applied to the anode $N_3$ of amplifier tube $V_3$ and the anodes $N_4'$ and $N_4''$ through the plate resistors $R_{10}$, $R_{13}$ and $R_{16}$ respectively. The sections of the duotriode $V_4$ are biased by cathode resistors $R_{12}$ and $R_{15}$.

The audio-frequency signal appearing at the output of the audio-frequency amplifier $A_2$ is applied through coupling condensers $C_{16}$ (see Fig. 3a) and $C_{40}$ (see Fig. 3b) to the control grid $G_4''$ of the other triode section $V_{4b}$ of the duotriode $V_4$, only a fraction of the output voltage being impressed on the control grid $G_4$ by virtue of the potential-dividing action of two resistors $R_{43}$ and $R_{44}$. The amplified audio-frequency signal appearing at the anode $N_4''$ and across the plate resistor $R_{16}$ is led through a coupling condenser $C_{18}$ to the earphones P.

The output of the main audio-frequency amplifier $A_2$ is also applied through the coupling condenser $C_{16}$ and $C_{40}$ and through a resistor $R_{14}$ to a rectifier section $V_{9b}$ of a duodiode $V_9$. The rectified output of the rectifier section $V_{9b}$ appears across a resistor $R_{17}$ and condenser $C_{17}$ connected in parallel therewith. The time constant of this parallel network is 0.1 sec. The rectified automatic control voltage appearing across the resistor $R_{17}$ is applied through a grid resistor $R_5$ to the control grid $G_2$ of the amplifier tube $V_2$ in the second stage of radio-frequency amplifier $A_1$.

The three regenerative amplifiers $A_5$, $A_6$ and $A_7$ are of the same general form, each of them including a triode section $V_{5a}$, $V_{6a}$ and $V_{7a}$ of duotriodes $V_5$, $V_6$ and $V_7$ respectively. The anode of each of these triodes is connected to the control grid thereof through a phase-shift feedback network comprising three series condensers and three shunt resistors. Thus, the feedback network of the first regenerative amplifier $A_5$ includes the three series of condensers $C_{24}$, $C_{25}$ and $C_{26}$, and the three shunt resistors $R_{22}$, $R_{23}$ and $R_{24}$. The feedback network of the second regenerative amplifier $A_6$ includes the three series of condensers $C_{28}$, $C_{29}$ and $C_{30}$, and the three shunt resistors $R_{27}$, $R_{28}$ and $R_{29}$ and the feedback network of the third regenerative amplifier $A_7$ includes the three series of condensers $C_{34}$, $C_{35}$ and $C_{36}$, and the three shunt resistors $R_{35}$ $R_{36}$ and $R_{37}$.

The amplifier sections $V_{5a}$, $V_{6a}$ and $V_{7a}$ are self-biased by means of resistors $R_{25}$, $R_{30}$ and $R_{41}$, which are shunted by audio-frequency bypass condensers $C_{23}$, $C_{31}$ and $C_{37}$ respectively. Plate voltage is supplied to the anodes of the amplifier tubes $V_{5a}$, $V_{6a}$ and $V_{7a}$ through load resistors $R_{18}$, $R_{31}$ and $R_{38}$ respectively.

Each of the phase-shift feedback networks connected to amplifier sections $V_{5a}$, $V_{6a}$ and $V_{7a}$ renders the corresponding regenerative amplifier $A_5$, $A_6$ and $A_7$ selectively responsive to audio-frequency signals having frequencies 400 C. P. S., 1300 C. P. S. and 3000 C. P. S. respectively. When a signal of the corresponding frequency is impressed upon any of the regenerative amplifiers, it is amplified more or less uniformly so long as the amplitude of the signal is below a predetermined level, but when the amplitude of that signal exceeds a predetermined level, the regenerative amplifier oscillates, producing a relatively large output which thereafter is increased but slightly as the amplitude of the signal impressed upon the regenerative amplifier increases, all as previously explained in connection with the discussion of Figs 5 and 6.

According to the present invention, the output of the main audio-frequency amplifier $A_2$ is applied through the coupling condensers $C_{16}$ and corresponding isolation resistors $R_{21}$, $R_{26}$ and $R_{34}$ to the input of each of the phase-shift networks of the corresponding regenerative amplifiers $A_5$, $A_6$ and $A_7$. With this arrangement, when an audio-frequency signal having a corresponding frequency and an amplitude in excess of the light-operating level is impressed upon the three regenerative amplifiers, that amplifier tuned to the frequency of the audio-frequency signal oscillates producing a large signal at its output, which is employed to energize an indicator light as explained more fully hereinbelow.

The output of each of the regenerative amplifiers $A_5$, $A_6$ and $A_7$ is applied through a corresponding coupling condenser $C_{28}$, $C_{32}$ or $C_{38}$ to a corresponding rectifier $A_8$, $A_9$ and $A_{10}$.

The rise time constants and the decay time constants of the three rectifiers $A_8$, $A_9$ and $A_{10}$ are all the same, being about equal to or less than the shortest period of any of the pulses of audio-frequency signals impressed thereon. As mentioned before, a time constant of about 0.025 sec. has been found to be satisfactory. The two rectifiers $A_8$, $A_9$ include different sections $V_{8a}$ and $V_{8b}$ of a duodiode rectifier $V_8$ and the demodulator $A_{10}$ includes a section $V_{9b}$ of another duodiode rectifier $V_9$. Each of the diodes of the demodulators $A_8$, $A_9$ and $A_{10}$ has a pair of resistors connected in series therewith with a condenser connected between the junction of each pair of resistors and ground. The first rectifiers $A_8$ is thus provided with resistors $R_{19}$ and $R_{20}$ and condenser $C_{22}$, the second rectifier $A_9$ resistors $R_{32}$ and $R_{33}$ and condenser $C_{33}$, and the third rectifier $A_{10}$ resistors $R_{39}$ and $R_{40}$ and condenser $C_{39}$.

The three resistors $R_{20}$, $R_{33}$ and $R_{40}$ are connected in the grid circuits of three amplifier tubes represented by sections of the duotriodes $V_{5b}$, $V_{6b}$ and $V_{7b}$. Each of these triodes is provided with a normally open electromagnetic relay $M_1$, $M_2$ and $M_3$ in its output. Each of the relays has an associated pair of normally open contacts $X_1$, $X_2$ and $X_3$ connected in series with a common voltage source $B_1$ and the three indicator lights $I_1$, $I_2$ and $I_3$.

A fixed bias, indicated in Fig. 3b by the symbol C+, is applied to the cathodes of the three amplifier tubes $V_{5b}$, $V_{6b}$ and $V_{7b}$ of sufficient value to reduce the current drawn through the coils of relays $M_1$, $M_2$ and $M_3$ to such a very low value as to maintain the relays restored to their normally open conditions. Thus, the relays are only operated when sufficiently large positive voltages are applied to the amplifier tubes $V_{5b}$, $V_{6b}$ and $V_{7b}$ by the corresponding demodulators $A_8$, $A_9$ and $A_{10}$. Thus, the values of the resistors $R_{20}$, $R_{33}$ and $R_{40}$ are maintained large enough to produce voltages sufficient to operate the relays. Thus, the values of the resistors $R_{20}$, $R_{33}$ and $R_{40}$ could be so low as to render the decay time constants of the demodulators $A_8$, $A_9$ and $A_{10}$ lower than the rise time constants thereof. In practice, satisfactory operation of the system has been obtained by choosing the values of the resistors $R_{20}$, $R_{33}$ and $R_{40}$ at such values at to render the decay time constants and the rise time constants of the rectifiers equal, as mentioned hereinbefore.

Constants of the various circuit elements that have been found to be satisfactory in the specific embodiment of this invention illustrated in Figs. 3a and 3b are as follows:

| | | |
|---|---|---|
| R-1 | ohms | 1000 |
| R-2 | do | 470 |
| R-3 | do | 1500 |
| R-4 | do | 270,000 |
| R-5 | do | 47,000 |
| R-6 | do | 1000 |
| R-7 | do | 270,000 |
| R-8 | megohms | 1 |
| R-9 | do | 10 |
| R-10 | ohms | 470,000 |
| R-11 | do | 470,000 |
| R-12 | do | 5,600 |
| R-13 | do | 220,000 |
| R-14 | do | 100,000 |
| R-15 | do | 470 |
| R-16 | do | 15,000 |
| R-17 | megohms | 1 |
| R-18 | ohms | 220,000 |
| R-19 | do | 270,000 |
| R-20 | megohms | 1 |
| R-21 | do | 6.8 |
| R-22 | ohms | 470,000 |
| R-23 | do | 470,000 |
| R-24 | do | 470,000 |
| R-25 | do | 5,600 |
| R-26 | megohms | 2.2 |
| R-27 | ohms | 270,000 |
| R-28 | do | 220,000 |
| R-29 | do | 220,000 |
| R-30 | do | 15,000 |
| R-31 | do | 220,000 |
| R-32 | do | 220,000 |
| R-33 | do | 270,000 |
| R-34 | do | 820,000 |
| R-35 | do | 390,000 |
| R-36 | do | 330,000 |
| R-37 | do | 330,000 |
| R-38 | do | 27,000 |
| R-39 | do | 270,000 |
| R-40 | megohms | 1 |
| R-41 | ohms | 4,700 |
| R-42 | do | 150 |
| R-43 | K | 150 |
| R-44 | meg | 1 |
| C-1 | μμf | 3.15 |
| C-2 | μμf | 10 |
| C-3 | μμf | .002 |
| C-4 | μμf | .001 |
| C-5 | μμf | 5 |
| C-6 | μμf | 5 |
| C-7 | μμf | 200 |
| C-8 | μμf | .001 |
| C-9 | μμf | .001 |
| C-10 | μμf | .001 |
| C-11 | μμf | 5 |
| C-12 | μμf | 10 |
| C-13 | μμf | 200 |
| C-14 | μμf | .002 |
| C-15 | μμf | .01 |
| C-16 | μμf | .01 |
| C-17 | μμf | .1 |
| C-18 | μμf | .25 |
| C-19 | μμf | .25 |
| C-20 | μμf | .25 |
| C-21 | μμf | .25 |
| C-22 | μμf | .05 |
| C-23 | μμf | .01 |
| C-24 | μμf | 500 |
| C-25 | μμf | 500 |
| C-26 | μμf | 500 |
| C-27 | μμf | .1 |
| C-28 | μμf | 270 |
| C-29 | μμf | 270 |
| C-30 | μμf | 270 |
| C-31 | μμf | .1 |
| C-32 | μμf | .01 |
| C-33 | μμf | .05 |
| C-34 | μμf | 100 |
| C-35 | μμf | 100 |
| C-36 | μμf | 100 |
| C-37 | μμf | .1 |
| C-38 | μμf | .01 |
| C-39 | μμf | .05 |
| C-40 | μμf | .001 |
| C-41 | μμf | .01 |
| V-1 | | 6BC5 |
| V-2 | | 6BC5 |
| V-3 | | 12AT6 |
| V-4 | | 12AV7 |
| V-5 | | 12AT7 |
| V-6 | | 12AT7 |
| V-7 | | 12AT7 |
| V-8 | | 12AL5 |
| V-9 | | 12AL5 |

With the circuit constants mentioned above the characteristics obtained in the circuit are substantially those illustrated in Figs. 5, 6 and 7, all of which have been explained in connection with the description previously given herein of the block diagram illustrated in Fig. 2.

It will be obvious, of course, now, to those skilled in the art, that this invention is not limited to the specific embodiment hereinabove described but is capable of a variety of electrical and mechanical embodiments. Various changes which will now suggest themselves to those skilled in the art may therefore be made in the frequencies and circuit constants employed and in the form, the details of construction, and the connections of the elements without departing from the principles of this invention.

While I have described and illustrated this invention hereinabove with particular reference to aircraft navigation and instrument landing systems employed with aircraft, it will be understood that this invention is applicable to other systems in which a plurality of signals of predetermined frequencies are employed to trigger relay circuits tuned to the respective frequencies. It will also be clear that this invention is particularly applicable to systems in which any of the trigger circuits is liable to be operated by one of the non-corresponding frequencies. It is thus clear that while this invention is particularly applicable to aircraft navigation, it is also applicable to other relay systems. Reference is therefore to be had to the appended claims to ascertain the scope of the invention.

The invention claimed is:

1. In apparatus for detecting a carrier wave that is modulated by a voice signal and that is also modulated by another audio-frequency signal, the modulation by said audio-frequency signal varying at a sub-audio frequency, an amplifier for amplifying said modulated carrier wave, a detector for rectifying said amplified carrier wave, means for listening to the rectified wave produced by said detector, a trigger circuit having a timing element connected to said detector, said trigger circuit being operated by waves of said audio frequency above a predetermined level, means having a first rise time constant and a first decay time constant for indicating when the level of waves of said audio frequency is above said predetermined level for more than a predetermined time, and means having a second rise time constant and a second decay time constant for maintaining the gain of said amplifier substantially constant while the output of said detector is low and for varying the gain of said amplifier inversely as a function of the output of said detector when said output is above said level, said first rise time constant being about equal to or less than the reciprocal of said sub-audio frequency, said first decay time constant being about equal to or less than said first rise time constant, said second rise time constant being long compared with the reciprocal of the lowest voice frequency required to understand said voice signals, said first rise time constant being greater than said second rise time constant, and said second decay time constant being greater than said second rise time constant.

2. In apparatus for detecting a carrier wave that is modulated by a voice signal and that is also modulated at any one of a series of predetermined audio frequencies, the modulation at each audio frequency varying at a corresponding sub-audio frequency, means for amplifying said modulated carrier wave, a detector for rectifying said amplified carrier wave, means for listening to the rectified wave produced by said detector, a plurality of tuned trigger circuits connected to said detector, each of said trigger circuits being tuned to a different one of said predetermined audio frequencies, each trigger circuit being operated when the amplitude of a wave of corresponding predetermined frequency impressed on said trigger circuit exceeds a predetermined value, means including a plurality of timing circuits operated by the respective trigger circuits having a first rise time constant and a first decay time constant for indicating which of said trigger circuits has operated for more than a predetermined time, and means having a second rise time constant and a second decay time constant and controlled by the output of said detector for varying the gain of said amplifier as an inverse function of the amplitude of the rectified wave when said amplitude is above a predetermined value whereby a wave of said audio-frequency operates only the corresponding trigger circuit and the voice signal output of said detector is limited while a trigger circuit is operated, said first rise time constant being about equal to or less than the reciprocal of said sub-audio frequency, said first decay time constant being about equal to or less than said first rise time constant, said second time rise constant being long compared with the reciprocal of the lowest voice frequency required to understand said voice signals, said first rise time constant being greater than said second rise time constant, and said second decay time constant being greater than said second rise time constant.

3. In audio-frequency modulated apparatus for detecting a carrier wave modulated by a voice signal which is modulated by another audio-frequency signal varying at a sub-audio frequency, means for amplifying said modulated carrier wave, a detector for rectifying said amplified carrier wave, a plurality of tuned trigger circuits connected to said detector, each of said trigger circuits being tuned to a different one of a series of predetermined audio frequencies, each trigger circuit being operated when the amplitude of a wave of corresponding predetermined frequency impressed on said trigger circuit exceeds a predetermined value, means including a plurality of timing circuits operated by the respective trigger circuits having a first rise time constant and a first decay time constant for indicating which of said trigger circuits has operated for more than a predetermined time, and means having a second rise time constant and a second decay time constant and controlled by the output of said detector for varying the gain of said amplifier as an inverse function of the amplitude of the rectified wave when said amplitude is above a predetermined value, said first rise time constant being about equal to or less than the reciprocal of said sub-audio frequency, said first decay time constant being about equal to or less than said first rise time constant, said second rise time constant being long compared with the reciprocal of the lowest voice frequency to understand said voice signals, said first rise time constant being greater than said second rise time constant, and said second decay time constant being greater than said second rise time constant.

4. In audio-frequency modulated apparatus for detecting a carrier wave modulated by a voice signal that is also modulated by another audio-frequency signal, the modulation by said audio-frequency signal varying at a sub-audio frequency, an amplifier for amplifying said modulated carrier wave, a detector for rectifying said amplified carrier wave, a trigger circuit having a timing element connected to said detector, said trigger circuit being only operated by waves of said audio frequency above a predetermined level, means having a first rise time constant and a first decay time constant for indicating when the level of waves of said audio frequency is above said predetermined level for more than a predetermined time, and means having a second rise time constant and a second decay time constant for maintaining the gain of said amplifier substantially constant while the output of said detector is low and for varying the gain of said amplifier inversely as a function of the output of said detector when said output is above said level, said first rise time constant being about equal to or less than the reciprocal of said sub-audio frequency, said first decay time constant being about equal to or less than said second rise time constant being long compared with the reciprocal of the lowest voice frequency to understand said voice signals, said first rise time constant, said first rise time constant being greater than said second rise time constant, and said second decay time constant being greater than said second rise time constant.

5. In audio-frequency modulated apparatus for detecting a carrier wave modulated by a voice signal that is also modulated by another audio-frequency signal, the modulation by said audio-frequency signal varying at a sub-audio frequency, an amplifier for amplifying said modulated carrier wave, a detector for rectifying said amplified carrier wave, a trigger circuit having a timing element connected to said detector, said trigger circuit being only operated by waves of said audio frequency above a predetermined level, means having a first rise time constant and a first decay time constant for indicating when the level of waves of said audio frequency is above said predetermined level for more than a predetermined time, and means having a second rise time constant and a second decay time constant for maintaining the gain of said amplifier substantially constant while the output of said detector is low and for varying the gain of said amplifier inversely as a function of the output of said detector when said output is above said level whereby a wave of said audio-frequency operates only the corresponding trigger circuit and the voice signal output of said detector is limited while a trigger circuit is operated, said first rise time constant being about equal to or less than the reciprocal of said sub-audio frequency, said rise time constant being long compared with the reciprocal of the lowest voice frequency to understand said voice signals, said first decay time constant being about equal to or less than said first rise time constant, said first rise time constant being greater than said second rise time constant, and said second decay time constant being greater than said second rise time constant, and means for indicating which of said trigger circuits is operated.

(References on following page)

References Cited in the file of this patent

UNITED STATES PATENTS

| | | |
|---|---|---|
| 1,959,062 | Place | May 15, 1934 |
| 2,070,900 | Harris | Feb. 16, 1937 |
| 2,131,042 | Halstead | Sept. 27, 1938 |
| 2,171,139 | Cornelius | Aug. 29, 1939 |
| 2,232,856 | Idle | Feb. 25, 1941 |
| 2,367,327 | Beers | Jan. 16, 1945 |
| 2,397,088 | Clay | Mar. 26, 1946 |
| 2,446,279 | Hammond | Aug. 3, 1948 |
| 2,498,730 | Williams | Feb. 28, 1950 |
| 2,675,468 | Vilkomerson | Apr. 13, 1954 |